United States Patent [19]

Magee et al.

[11] Patent Number: 4,580,249
[45] Date of Patent: Apr. 1, 1986

[54] APPARATUS FOR AND METHOD OF DOPPLER MOTION DETECTION WITH STANDING WAVE DRIFT COMPENSATION

[75] Inventors: Mark R. Magee, Saratoga, Calif.; Richard E. Saffran, Boston, Mass.; G. Kirby Miller, Saratoga, Calif.

[73] Assignee: GTE Government Systems Corporation, Stamford, Conn.

[21] Appl. No.: 675,034

[22] Filed: Nov. 26, 1984

[51] Int. Cl.[4] .............................................. G08B 13/24
[52] U.S. Cl. ...................................... 367/94; 340/553; 340/554
[58] Field of Search .................... 367/94, 93; 340/553, 340/554

[56] References Cited

U.S. PATENT DOCUMENTS 3,407,403 10/1968 Charlot, Jr. ........................... 340/554
4,142,187 2/1979 Nakayama ............................. 367/94
4,198,618 4/1980 Kleinschmidt ......................... 367/94

Primary Examiner—Glen R. Swann, III
Attorney, Agent, or Firm—John F. Lawler; Douglas M. Gilbert

[57] ABSTRACT

Drift of the standing wave pattern in an acoustic doppler intrusion detection system with radiating and receiving transducers in a confined space is compensated by changing the operating frequency of the carrier wave generator when the magnitude of the received carrier wave is less than a predetermined threshold level. The magnitude of the received carrier wave is continuously monitored and compared to the threshold level. The generator frequency is incrementally increased until the carrier wave magnitude is optimum. This invention comprehends the apparatus for and method of optimizing signal strength at the receiving transducer by this technique.

4 Claims, 2 Drawing Figures

APPARATUS FOR AND METHOD OF DOPPLER MOTION DETECTION WITH STANDING WAVE DRIFT COMPENSATION

This invention was made under a contract with the Defense Nuclear Agency.

RELATED APPLICATION

Ser. No. 675,033 filed 11-26-85 "APPARATUS FOR AND METHOD OF DOPPLER MOTION DETECTION WITH STANDING WAVE DRIFT COMPENSATION."

BACKGROUND OF THE INVENTION

This invention relates to intrusion detection systems and more particularly to an acoustic doppler motion detection system used to detect moving objects in a confined space.

Acoustic doppler motion detection systems are used in enclosed volumes such as rooms and the like and operate by transmitting or radiating a signal and monitoring the return signal for changes caused by motion of an object within the room. Many of the such rooms are reverberant and as such, under steady state conditions, produce a fixed standing wave pattern with nulls and peaks throughout the room. Because this standing wave pattern exists in the room, the level or magnitude of the signal at the receiving tansducer depends on the location of the latter relative to the pattern. If the location of contents of the protected space, such as crates in a warehouse of furniture in an office, remains unchanged indefinitely, the standing wave pattern is essentially stationary (unless there is a change in temperature) and the level of the received signal is substantially constant. However, if the contents are moved within the space or if the air temperature changes, the standing wave pattern changes so that the receiving transducer may be located at a null resulting in poor signal strength and degradation of system performance.

One technique that has been proposed to overcome this problem is the use of a distributed microphone such as an elongated electret cable or tape which is sensitive throughout its length. The rationale for this approach was that differences in signal strength due to the standing wave pattern would average out over the length of the microphone. In practice, however, this was not the case and the technique proved to be unsuccessful.

This invention is directed toward a solution of this problem.

OBJECTS AND SUMMARY OF THE INVENTION

A general object of the invention is the provision of an acoustic doppler detection system in which standing wave drift is effectively compensated.

A further object is the provision of such a system in which compensation for standing wave drift is achieved electronically.

Another object is the provision of a novel method of automatically compensating standing wave drift in an acoustic doppler motion detection system.

These and other objects of the invention are achieved with apparatus for and a method of changing the operating frequency of the acoustic wave generator when the strength of the received carrier wave is below a predetermined threshold.

DESCRIPTION OF PREFERRED EMBODIMENTS

Figure 1:
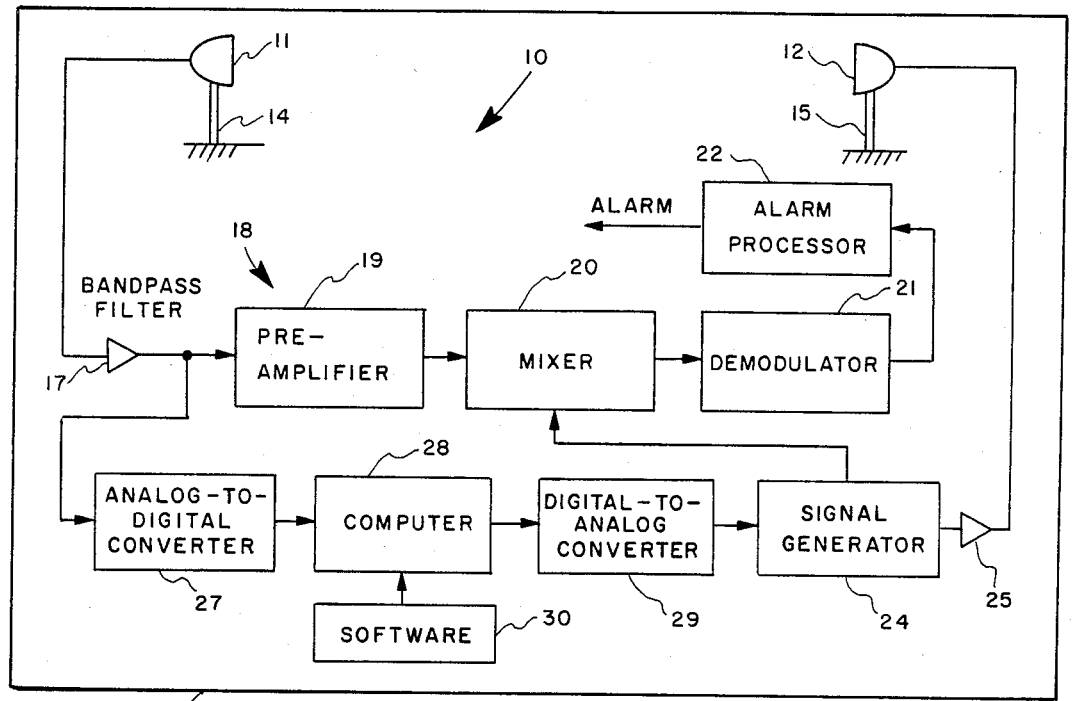
FIG. 1 is a schematic and block diagram of an acoustic doppler detection apparatus embodying the invention.

Referring to the drawings, FIG. 1 illustrates a preferred embodiment of the invention in a confined space represented as a room R and comprises doppler detection apparatus 10 having a receiving transducer 11 and a radiating transducer 12 spaced apart in room R as shown. Receiving transducer 11 preferably is a microphone and radiating transducer 12 may be a loud speaker or tweeter which radiates an acoustic wave at, for example, 2 kHz into the entire room. This carrier wave is reflected from the room walls and objects within the room. Because the room is reverberant an acoustic standing wave pattern with peaks and nulls is set up throughout the room. Receiving transducer 11 and radiating transducer 12 are mounted on fixed supports 14 and 15, respectively.

The output of receiving transducer 11 is electrically connected through a bandpass filter 17 to a receiving circuit 18 consisting of a preamplifier 19, mixer 20, demodulator 21 and alarm processor 22. Doppler detector 18 compares the output of demodulator 21 with a threshold voltage and produces an alarm signal output when there is movement of an object in room R. The output of alarm processor 22 energizes an alarm device such as a bell or visual display. Receiving circuit 18 is essentially the same as that described in our copending application Ser. No. 675,033 (which is incorporated herein by reference) and does not per se constitute this invention.

Radiating transducer 12 is electrically connected to signal generator 24 through a power amplifier 25. The output from generator 24 is also connected to mixer 20 in the receiving circuit as shown for processing of the received signal as is well known in the art.

Figure 2:
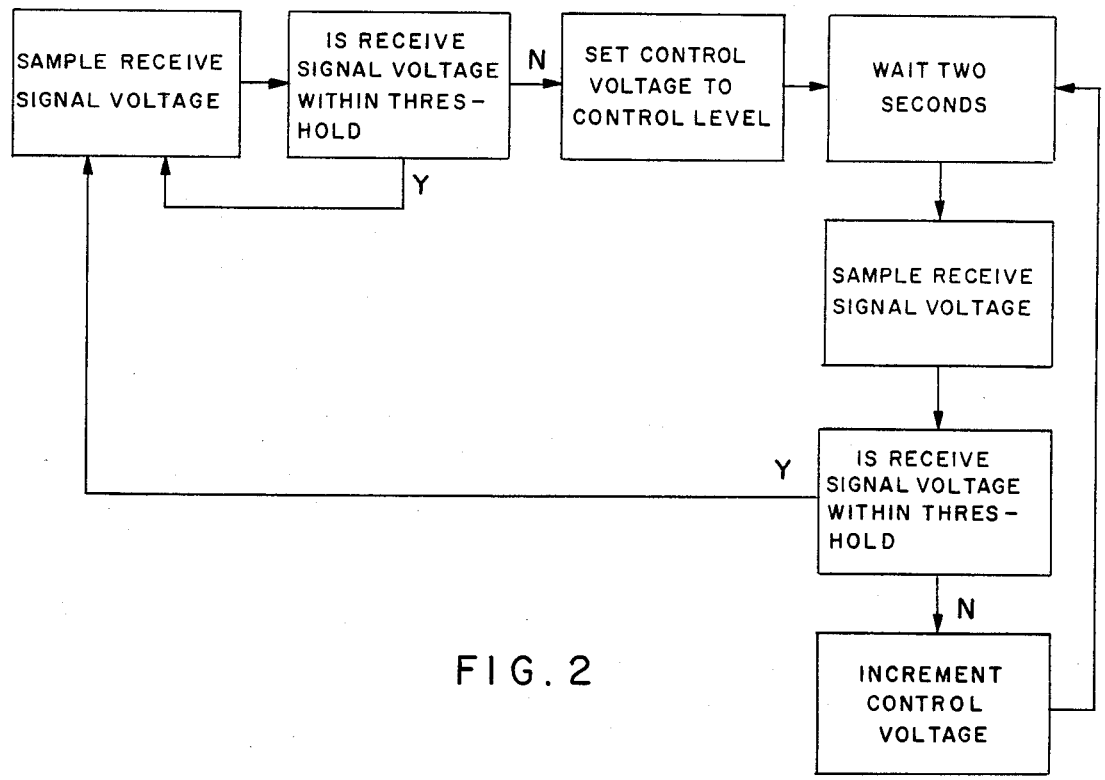
FIG. 2 is a block diagram of an algorithm for operating the computer shown in FIG. 1.

In accordance with this invention, the output of filter 17 is also connected to an analog-to-digital converter 27 which converts the received signal to digital form for transmission to a digital microcomputer 28, the output of which is reconverted to analog form by a digital-to-analog converter 29 and passed to signal generator 24. Computer 28 is programmed by software 30 to cause the received signal to be periodically sampled and to produce an analog control signal which incrementally adjusts the operating frequency of signal generator 24 when the amplitude of the received signal at transducer 11 falls below a predetermined threshold level. Software 30 is based on an algorithm shown in FIG. 2. Thus the standing wave pattern of acoustic waves propagated into the room R by the radiating transducer 12 is altered to compensate for any drift detected by this level sensing circuit.

In operation, transducer 12 radiates a tone at a predetermined frequency, such as 2 kHz, into room R and transducer 11 receives the signal which includes waves reflected from objects in the room. If there is no movement within the room, the output from demodulator 21 is less than the threshold level of alarm processor 22 which then does not produce an output to the alarm device. If an object, such as a person, in room R does move, such movement amplitude modulates the carrier wave which is demodulated by demodulator 21 to produce an output to alarm processor 22 above the threshold thereof and to cause activation of the alarm device.

What is claimed is:

1. Apparatus for indicating motion of an object in a confined space to the degree that said object amplitude modulates a carrier wave, said apparatus comprising:

means for generating the carrier wave at a predetermined frequency;

radiator means connected to said generating means and positioned to radiate the carrier wave into said space;

receiver means spaced from said radiator means and positioned in said space to receive said carrier wave;

demodulator means connected to the output of said receiver means whereby to demodulate said carrier wave and to produce an alarm in response to movement of an object in said space; and means for sensing the signal strength of said received carrier wave and for changing said carrier wave frequency in response to a decrease in signal strength of said received carrier wave below a predetermined level.

2. Apparatus according to claim 1 in which said last named means comprises signal processing means connected to the output of said receiver means, said signal processing means having an output connected to said wave generating means and being responsive to the amplitude of said receiver means output for changing the frequency of said wave when the latter is less than a predetermined threshold level.

3. A method of detecting motion of an object in a confined space to the degree that said object frequency modulates a carrier wave in a predetermined frequency range, consisting of the steps of:

generating said carrier wave;

radiating said carrier wave into said confined space;

receiving said carrier wave in said space;

demodulating the received carrier wave and producing an alarm when the frequency of the received carrier wave differs from said radiated carrier wave by more than a predetermined amount; and changing the frequency of the generated carrier wave in response to a change in signal level of the carrier wave at the point of reception until the strength of the received carrier wave is optimum.

4. The method according to claim 3 in which the last recited step includes the steps of:

sampling the received carrier wave;

determining whether the magnitude of the sampled wave is below a predetermined threshold level;

incrementally increasing the frequency of the carrier wave; and repeating the last three steps until the magnitude of the sampled wave is above said threshold level.

* * * * *